United States Patent
Kai et al.

(10) Patent No.: US 9,306,215 B2
(45) Date of Patent: Apr. 5, 2016

(54) NICKEL-METAL HYDRIDE SECONDARY CELL AND NEGATIVE ELECTRODE THEREFOR

(71) Applicant: FDK CORPORATION, Minato-ku, Tokyo (JP)

(72) Inventors: Takuya Kai, Takasaki (JP); Jun Ishida, Takasaki (JP)

(73) Assignee: FDK CORPORATION, Minato-ku, Tokyo (JP)

( * ) Notice: Subject to any disclaimer, the term of this patent is extended or adjusted under 35 U.S.C. 154(b) by 307 days.

(21) Appl. No.: 13/945,824

(22) Filed: Jul. 18, 2013

(65) Prior Publication Data

US 2014/0030583 A1 Jan. 30, 2014

(30) Foreign Application Priority Data

Jul. 27, 2012 (JP) ................................ 2012-166620

(51) Int. Cl.
*H01M 4/38* (2006.01)
*C01B 3/00* (2006.01)
(Continued)

(52) U.S. Cl.
CPC ............. *H01M 4/383* (2013.01); *C01B 3/0057* (2013.01); *C22C 1/02* (2013.01); *C22C 1/0433* (2013.01); *C22C 19/058* (2013.01); *H01M 10/345* (2013.01); *H01M 4/242* (2013.01); *H01M 2300/0014* (2013.01); *Y02E 60/124* (2013.01); *Y02E 60/327* (2013.01)

(58) Field of Classification Search
CPC .. C01B 3/0057; H01M 4/383; H01M 10/345; H01M 4/242; H01M 2300/0014; C22C 19/058; C22C 1/0433; C22C 1/02
See application file for complete search history.

(56) References Cited

U.S. PATENT DOCUMENTS

2004/0134569 A1  7/2004 Yasuoka et al.
2007/0065722 A1*  3/2007 Endo et al. ................. 429/218.2

FOREIGN PATENT DOCUMENTS

CN  102 403 490 A  4/2012
JP  11-323469  11/1999

OTHER PUBLICATIONS

Liu et al., "Rare earth-Mg-Ni-based hydrogen storage alloys as negative electrode materials for Ni/Mh batteries," Journal of Alloys and Compounds, Elsevier Sequoia, Lausanne, Switzerland, vol. 509, No. 3, pp. 675-686, 2011.

Miao et al., "A study on the microstructures and electrochemical properties of La0.7Mg0.3Ni2.45-xCrxCo0.75Mn0.1A10.2(x=0.00-0.20) hydrogen storage electrode alloys," International Journal of Hydrogen Energy, Elsevier Science Publishers B.V., Barking, Great Britain, vol. 33, No. 1, pp. 134-140, 2007.

Wang et al., "Effects of Cr addition on the microstructures and electrochemical performances of La-Mg-Ni system (PuNi3-type) hydrogen storage alloy," Journal of Alloys and Compounds, Elsevier, Sequoia, Lausanne, Switzerland, vol. 446-447, pp. 625-629, 2007.

(Continued)

*Primary Examiner* — Milton I Cano
*Assistant Examiner* — Michael Dignan
(74) *Attorney, Agent, or Firm* — Marshall, Gerstein & Borun LLP

(57) ABSTRACT

A nickel-metal hydride secondary cell holds therein an electrode group and an alkaline electrolyte solution containing NaOH as a main constituent of its solute. The electrode group has positive and negative electrodes lapped one over the other with a separator therebetween. The negative electrode contains a hydrogen absorbing alloy having a composition represented by the general formula: $(RE_{1-x}T_x)_{1-y}Mg_yNi_{z-a}Al_a$ (where RE is at least one element selected from among Y, Sc and rare-earth elements, T is at least one element selected from among Zr, V and Ca, and subscripts x, y, z and a are values respectively satisfying $0 \leq x$, $0.05 \leq y \leq 0.35$, $2.8 \leq z \leq 3.9$, and $0.10 \leq a \leq 0.25$), the hydrogen absorbing alloy has a crystal structure in which an $AB_2$ subunit and an $AB_5$ subunit are superimposed one upon the other, and Cr is substituted for part of the Ni.

3 Claims, 1 Drawing Sheet

(51) Int. Cl.
*H01M 10/34* (2006.01)
*C22C 1/02* (2006.01)
*C22C 19/05* (2006.01)
*C22C 1/04* (2006.01)
*H01M 4/24* (2006.01)

(56) References Cited

OTHER PUBLICATIONS

Extended European Search Report for EP 13177999.3, dated Nov. 26, 2013.

\* cited by examiner

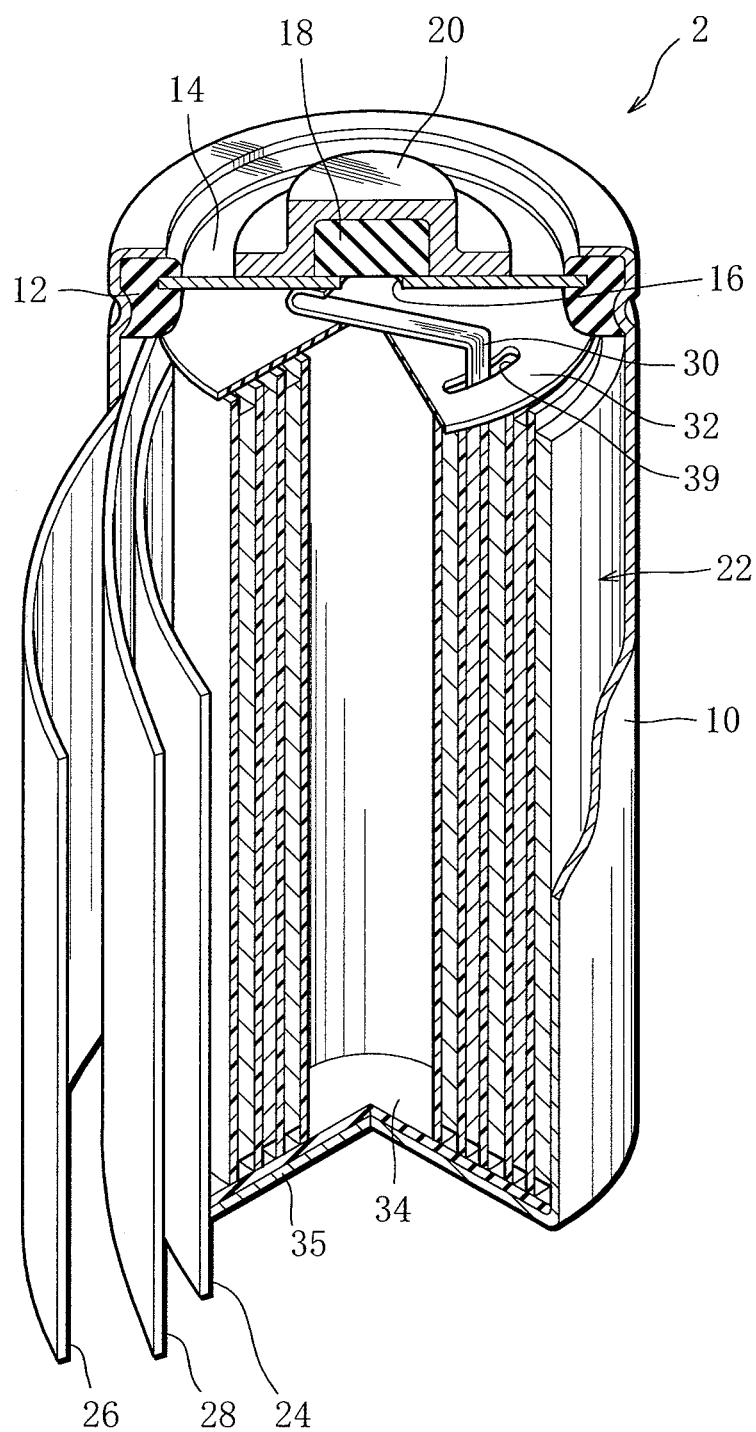

NICKEL-METAL HYDRIDE SECONDARY CELL AND NEGATIVE ELECTRODE THEREFOR

BACKGROUND OF THE INVENTION

1. Field of the Invention

The present invention relates to a nickel-metal hydride secondary cell and a negative electrode therefor.

2. Description of the Related Art

Nickel-metal hydride secondary cells have high capacity and superior environmental safety, compared with nickel-cadmium secondary cells, and thus have come to be used in a variety of applications, such as various types of portable devices and hybrid electric vehicles.

A hydrogen absorbing alloy used in the negative electrode of such a nickel-metal hydride secondary cell is capable of storing an amount of hydrogen 1000 times or more the volume of the alloy and is one of important constituent materials of the nickel-metal hydride secondary cell. Hydrogen absorbing alloys generally used include, for example, a $LaNi_5$ hydrogen absorbing alloy, which is a rare earth-Ni hydrogen absorbing alloy with $AB_5$ structure including a $CaCu_5$-type crystal as its main phase, and a hydrogen absorbing alloy with $AB_2$ structure including, as its main phase, a crystal of Laves phase containing Ti, Zr, V and Ni.

Because of a wide variety of applications, there has been a demand for nickel-metal hydride secondary cells having even higher capacity. However, the hydrogen storage capabilities of the existing hydrogen absorbing alloys mentioned above are not necessarily high enough to meet the demand for increased capacity.

In recent years, there has been proposed a rare earth-Mg—Ni hydrogen absorbing alloy with a composition obtained by substituting Mg for part of the rare-earth element in a rare earth-Ni hydrogen absorbing alloy, in order to improve the hydrogen storage capability of the hydrogen absorbing alloy. This rare earth-Mg—Ni hydrogen absorbing alloy is capable of storing a large amount of hydrogen gas, compared with conventional rare earth-Ni hydrogen absorbing alloys (cf. Unexamined Japanese Patent Publication No. 11-323469).

A nickel-metal hydride secondary cell using the above rare earth-Mg—Ni hydrogen absorbing alloy as its negative electrode material has high capacity and is also characterized by suppressed self-discharge and prolonged cycle life, as compared with conventional secondary cells. However, just using the rare earth-Mg—Ni hydrogen absorbing alloy is still not enough to meet the demand for nickel-metal hydride secondary cells having satisfactory self-discharge characteristics and cycle life characteristics.

One cause of self-discharge of the nickel-metal hydride secondary cell is dissociation of hydrogen, for example. Hydrogen dissociated from the hydrogen absorbing alloy of the negative electrode diffuses into the alkaline electrolyte solution, reaches the positive electrode and reduces $Ni(OH)_2$, which is a positive electrode active material, thus causing self-discharge.

On the other hand, one cause of shortening in the cycle life of the nickel-metal hydride secondary cell is ease of cracking of the hydrogen absorbing alloy, for example. Specifically, as hydrogen is repeatedly stored in and released from the hydrogen absorbing alloy of the negative electrode due to charging and discharging of the secondary cell, the hydrogen absorbing alloy cracks and pulverizes. When the hydrogen absorbing alloy cracks, a large number of new surfaces having high reactivity are formed in the alloy. The electrolyte solution in the cell reacts with the newly formed surfaces, so that the hydrogen absorbing alloy is oxidized and thus deteriorated. During the reaction of the electrolyte solution with the newly formed surfaces, the electrolyte solution is consumed and reduced, with the result that the internal resistance of the cell increases, causing lowering of electrical conductivity. Such a phenomenon is generally called dry-out. That is to say, a cell using an easy-to-crack hydrogen absorbing alloy is prone to dry-out and becomes difficult to discharge at a stage where the number of times charging and discharging have been repeated is relatively small, resulting in shortening of the cycle life.

Thus, various researches have hitherto been conducted to solve these problems and to further improve cell characteristics.

However, currently available cells still do not have satisfactory self-discharge characteristics and cycle life characteristics.

SUMMARY OF THE INVENTION

According to the present invention, there is provided a nickel-metal hydride secondary cell comprising a container, and an electrode group hermetically contained in the container together with an alkaline electrolyte solution, the electrode group including a separator, a negative electrode and a positive electrode, wherein the negative electrode contains a hydrogen absorbing alloy having a composition represented by a general formula: $(RE_{1-x}T_x)_{1-y}Mg_yNi_{z-a}Al_a$ (where RE is at least one element selected from among Y, Sc and rare-earth elements, T is at least one element selected from among Zr, V and Ca, and subscripts x, y, z and a are values respectively satisfying $0 \leq x$, $0.05 \leq y \leq 0.35$, $2.8 \leq z \leq 3.9$, and $0.10 \leq a \leq 0.25$), the hydrogen absorbing alloy has a crystal structure in which an $AB_2$ subunit and an $AB_5$ subunit are superimposed one upon the other, and Cr is substituted for part of the Ni.

BRIEF DESCRIPTION OF THE DRAWING

The present invention will become more fully understood from the detailed description given hereinafter and the accompanying drawing which is given by way of illustration only, and thus, is not limitative of the present invention, and wherein:

FIG. 1 is a partially cutaway perspective view of a nickel-metal hydride secondary cell according to one embodiment of the present invention.

DETAILED DESCRIPTION OF THE INVENTION

A nickel-metal hydride secondary cell (hereinafter referred to merely as cell) 2 according to the present invention will be described below with reference to the drawing.

The type of cell to which the present invention is applicable is not particularly limited. In the following description, the present invention is applied to a size AA cylindrical cell 2 illustrated in FIG. 1, by way of example.

As shown in FIG. 1, the cell 2 is provided with an outer can 10 having a bottomed cylindrical shape with an upper open end. The outer can 10 has electrical conductivity, and a bottom wall 35 thereof functions as a negative terminal. A disc-shaped cover plate 14 having electrical conductivity and ring-shaped electrical insulating packing 12 surrounding the cover plate 14 are arranged in the opening of the outer can 10. An edge 37 of the open end of the outer can 10 is swaged such that the cover plate 14 and the insulating packing 12 are fixed to the edge 37 of the outer can 10. That is, the cover plate 14 and the insulating packing 12 cooperate with each other to gastightly close the opening of the outer can 10.

The cover plate 14 has a central through hole 16 formed in the center thereof, and a valve element 18 of rubber is arranged on the outer surface of the cover plate 14 so as to close the central through hole 16. Further, a flanged cylindrical positive terminal 20 is fixed on the outer surface of the cover plate 14 so as to cover the valve element 18 and presses the valve element 18 toward the cover plate 14. A gas vent hole, not shown, is bored through the positive terminal 20.

Usually, the central through hole 16 is gastightly closed with the valve element 18. On the other hand, if the internal pressure of the outer can 10 rises due to gas generated within the outer can 10, the valve element 18 is compressed by the internal pressure and opens the central through hole 16. As a result, the gas is released to the outside from within the outer can 10 through the central through hole 16 and the gas vent hole of the positive terminal 20. Namely, the central through hole 16, the valve element 18 and the positive terminal 20 constitute a safety valve for the cell.

An electrode group 22 is contained in the outer can 10. The electrode group 22 includes a positive electrode 24, a negative electrode 26 and a separator 28, each in the form of a strip, and is spirally rolled up with the separator 28 interposed between the positive electrode 24 and the negative electrode 26. That is, the positive electrode 24 and the negative electrode 26 are superimposed with the separator 28 therebetween. The outer periphery of the rolled electrode group 22 is formed by part (outermost turn) of the negative electrode 26 and is disposed in contact with the inner peripheral wall of the outer can 10. Namely, the negative electrode 26 and the outer can 10 are electrically connected to each other.

A positive electrode lead 30 is arranged inside the outer can 10 and between the electrode group 22 and the cover plate 14. Specifically, the positive electrode lead 30 has one end connected to the positive electrode 24 and has the other end connected to the cover plate 14. Consequently, the positive terminal 20 and the positive electrode 24 are electrically connected to each other via the positive electrode lead 30 and the cover plate 14. A circular electrical insulating member 32 is arranged between the cover plate 14 and the electrode group 22, and the positive electrode lead 30 extends through a slit 39 formed in the insulating member 32. A circular insulating member 34 is also arranged between the electrode group 22 and the bottom of the outer can 10.

A predetermined amount of an alkaline electrolyte solution (not shown) is contained in the outer can 10. The electrode group 22 is immersed in the alkaline electrolyte solution to enable charging and discharging to take place through the action of the positive and negative electrodes 24 and 26. As the alkaline electrolyte solution, an alkaline electrolyte solution containing NaOH as a main constituent of its solute is preferably used. To be more precise, an aqueous solution of sodium hydroxide is used. The alkaline electrolyte solution to be used in the present invention has only to contain NaOH as a main constituent of its solute, and the solute may contain NaOH singly or may contain at least one of KOH and LiOH, for example, in addition to NaOH. Where the alkaline electrolyte solution additionally contains KOH or LiOH as its solute, the content of NaOH is made greater than that of KOH or LiOH. A cell using such an alkaline electrolyte solution containing NaOH as a main constituent of its solute exhibits excellent self-discharge characteristics.

The separator 28 to be used may be non-woven fabric of polyamide fibers or non-woven fabric of polyolefin fibers, such as polyethylene fibers or polypropylene fibers, and the non-woven fabric is hydrophilically functionalized. Specifically, non-woven fabric chiefly containing polyolefin fibers imparted with a sulfone group by sulfonation is preferably used. The sulfone group is imparted by treating the non-woven fabric with an acid containing a sulfate group, such as sulfuric acid or fuming sulfuric acid. A cell using such a separator containing the fibers imparted with a sulfone group shows excellent self-discharge characteristics.

The positive electrode 24 comprises an electrically conductive positive electrode substrate having a porous structure, and a positive electrode mixture held in the pores of the positive electrode substrate.

For the positive electrode substrate, a net-like, spongy or fibrous metal body plated with nickel, or nickel foam may be used, for example.

The positive electrode mixture contains particles of a positive electrode active material, a conductive material, a positive electrode additive and a binder. The binder serves to bind the particles of the positive electrode active material, the conductive material and the positive electrode additive together and at the same time performs the function of causing the positive electrode mixture to adhere to the positive electrode substrate. As the binder, carboxymethyl cellulose, methylcellulose, a dispersion of PTFE (polytetrafluoroethylene), a dispersion of HPC (hydroxypropyl cellulose) or the like may be used, for example.

The particles of the positive electrode active material are particles of nickel hydroxide or higher-order nickel hydroxide. The nickel hydroxide particles are preferably prepared as a solid solution containing at least one kind of zinc, magnesium and cobalt.

As the conductive material, one or two or more kinds selected from among cobalt compounds such as cobalt oxide (CoO) and cobalt hydroxide ($Co(OH)_2$), and cobalt (Co) may be used. The conductive material is added to the positive electrode mixture as needed and may be added to the positive electrode mixture in the form of powder or a coating covering the surface of the positive electrode active material.

The positive electrode additive is added in order to improve characteristics of the positive electrode, and yttrium oxide, zinc oxide or the like may be used, for example.

The particles of the positive electrode active material are obtained in the manner described below, for example.

First, an aqueous solution of nickel sulfate is prepared. An aqueous solution of sodium hydroxide is added by degrees to the aqueous solution of nickel sulfate for reaction so that particles of nickel hydroxide may separate out. In the case of obtaining a solid solution of nickel hydroxide particles containing zinc, magnesium and cobalt, nickel sulfate, zinc sulfate, magnesium sulfate and cobalt sulfate are weighed so as to have a predetermined composition, and an aqueous solution of the mixture is prepared. With the obtained aqueous solution of the mixture kept stirred up, an aqueous solution of sodium hydroxide is added by degrees to the aqueous solution of the mixture for reaction, to separate out a solid solution of a particulate positive electrode active material containing nickel hydroxide as its main constituent and additionally containing zinc, magnesium and cobalt.

The positive electrode 24 can be obtained in the manner described below, for example.

First, paste of a positive electrode mixture is prepared which contains powder of the particulate positive electrode active material obtained in the aforementioned manner, the conductive material, the positive electrode additive, water and the binder. The positive electrode mixture paste thus obtained is filled in pores of a spongy metal body of nickel, for example, and then dried. After the drying, the metal body filled with the nickel hydroxide particles and the like is extended by rolling and then cut. In this manner, the positive electrode 24 carrying the positive electrode mixture is obtained.

The negative electrode 26 will now be described.

The negative electrode 26 has an electrically conductive negative electrode substrate (core) in the form of a strip, and a negative electrode mixture is carried on the negative electrode substrate.

The negative electrode substrate is a metal sheet having through holes distributed over its entire area and may be, for example, a perforated metal sheet or a sintered substrate obtained by molding metal powder into shape and sintering the molded metal powder. The negative electrode mixture is not only filled in the through holes of the negative electrode substrate but also carried in layers on both surfaces of the negative electrode substrate.

The negative electrode mixture contains particles of a hydrogen absorbing alloy capable of storing and releasing hydrogen as a negative electrode active material, and additionally contains an electrically conductive material and a binder. The binder serves to bind the hydrogen absorbing alloy particles and the conductive material together and at the same time to cause the negative electrode mixture to adhere to the negative electrode substrate. A hydrophilic or hydrophobic polymer or the like may be used as the binder, and carbon black or graphite may be used as the conductive material.

The hydrogen absorbing alloy constituting the hydrogen absorbing alloy particles is obtained by adding Cr to a rare earth-Mg—Ni hydrogen absorbing alloy containing a rare-earth element, Mg and Ni. Specifically, the hydrogen absorbing alloy to be used has a composition obtained by adding Cr to a rare earth-Mg—Ni hydrogen absorbing alloy with a composition not including Mn and Co. More specifically, a hydrogen absorbing alloy obtained by substituting Cr for part of Ni in a rare earth-Mg—Ni hydrogen absorbing alloy represented by the general formula:

$$(RE_{1-x}T_x)_{1-y}Mg_yNi_{z-a}Al_a \quad (I)$$

is used. In the general formula (I), RE denotes at least one element selected from among Y, Sc and rare-earth elements, more specifically, at least one element selected from among La, Ce, Pr, Nd, Pm, Sm, Eu, Gd, Tb, Dy, Ho, Er, Tm, Yb, Lu, Sc and Y, T denotes at least one element selected from among Zr, V and Ca, and the subscripts x, y, z and a denote values respectively satisfying $0 \leq x$, $0.05 \leq y \leq 0.35$, $2.8 \leq z \leq 3.9$, and $0.10 \leq a \leq 0.25$.

The rare earth-Mg—Ni hydrogen absorbing alloy has the $Ce_2Ni_7$-type structure in which an $AB_2$ subunit and an $AB_5$ subunit are superimposed one upon the other, or a crystal structure similar thereto and has the advantage that the storage and release of hydrogen is stable, which is characteristic of $AB_5$ alloys, as well as the advantage that the hydrogen storage capacity is large, which is characteristic of $AB_2$ alloys. Accordingly, the hydrogen absorbing alloy employed in the present invention has excellent hydrogen storage capability, so that the cell 2 obtained has high capacity.

Also, by virtue of the action of Cr, the rare earth-Mg—Ni hydrogen absorbing alloy is less liable to cracking accompanying the storage and release of hydrogen, and thus, pulverization of the alloy is suppressed. With this hydrogen absorbing alloy, therefore, the formation of new surfaces with high reactivity is less likely to occur, making it possible to restrain corrosion reaction of the hydrogen absorbing alloy from being caused by the electrolyte solution. As a result, consumption of the electrolyte solution due to such corrosion is reduced, and since the dry-out phenomenon can be suppressed, the cell 2 obtained has improved cycle life characteristics.

Further, Cr is easily alloyed with the Ni in the rare earth-Mg—Ni hydrogen absorbing alloy, and the alloy of Cr and Ni is thought to be formed on the surface of the hydrogen absorbing alloy. Where the alloy of Cr and Ni exists on the surface of the hydrogen absorbing alloy, the surface of the hydrogen absorbing alloy is presumably modified and lowered in reactivity. If the reactivity at the surface of the hydrogen absorbing alloy is low, dissociation of hydrogen from the hydrogen absorbing alloy is restrained, making it possible to suppress self-discharge of the cell 2 due to dissociation of hydrogen.

The aforementioned effect of improving the cycle life and self-discharge characteristics, achieved by Cr, is not sufficiently great if the Cr content in the hydrogen absorbing alloy is low. If the Cr content is too high, however, the cycle life characteristics lower. Accordingly, provided that the sum of the elements represented by RE and T in the general formula (I) and the Mg is 1 mole, the Cr content is preferably in the range greater than or equal to 0.01 moles and smaller than or equal to 0.02 moles. By controlling the Cr content so as to fall within this range, it is possible to improve both the cycle life and self-discharge characteristics of the cell obtained.

The aforementioned hydrogen absorbing alloy particles are obtained in the manner described below, for example.

First, primary metallic materials are weighed and mixed so as to have the predetermined composition, and after melting the mixture in, for example, an induction melting furnace, the mixture is cooled to form an ingot. The obtained ingot is then heat-treated at 900 to 1200° C. under an inert gas atmosphere for 5 to 24 hours. Subsequently, the ingot is cooled to room temperature, crushed, and sieved to sort out particles of desired size, thereby obtaining the hydrogen absorbing alloy particles.

The negative electrode 26 can be obtained in the manner described below, for example.

First, powder of the hydrogen absorbing alloy particles, the conductive material, the binder and water are kneaded to prepare paste of a negative electrode mixture. The obtained negative electrode mixture paste is applied to the negative electrode substrate and then dried. After the drying, the negative electrode substrate to which the hydrogen absorbing alloy particles and the like adhere is extended by rolling and then cut, thereby obtaining the negative electrode 26.

The positive electrode 24 and the negative electrode 26 obtained in the aforementioned manner are spirally rolled up with the separator 28 interposed therebetween, to form the electrode group 22.

The electrode group 22 thus obtained is contained in the outer can 10. Then, a predetermined amount of the alkaline electrolyte solution is poured into the outer can 10. Subsequently, the outer can 10 containing the electrode group 22 and the alkaline electrolyte solution is hermetically sealed with the cover plate 14 provided with the positive terminal 20, thereby obtaining the cell 2 of the present invention.

By virtue of the synergy effect of the combination of the aforementioned constituent elements, the cell 2 according to the present invention has high capacity and is also excellent in self-discharge characteristics and cycle life characteristics, compared with conventional cells. Thus, the cell 2, if charged in advance by the user, can provide the advantage that a situation where the cell needs to be recharged immediately before use can be lessened, because the remaining capacity of the cell decreases at a low rate even if the cell is left to stand for a long period of time. Further, the cell 2 provides the advantage that the cell can be used over a long period of time, because the cell can be repeatedly charged and discharged an increased number of times.

EXAMPLES

1. Production of Cell

Example 1

(1) Preparation of Hydrogen absorbing alloy and Negative Electrode

First of all, a first mixture containing 20% by weight (wt %) of lanthanum, 40 wt % neodymium, 39 wt % samarium and 1 wt % zirconium was prepared. The obtained first mixture, magnesium, nickel, aluminum and chromium were weighed to prepare a second mixture containing the first mixture, magnesium, nickel, aluminum and chromium in a molar ratio of 0.89:0.11:3.27:0.17:0.01. The second mixture obtained in this manner was melted in an induction melting furnace and then cooled to obtain an ingot. Subsequently, the ingot was heat-treated at a temperature of 1000° C. under an argon gas atmosphere for 10 hours, to obtain an ingot of a hydrogen absorbing alloy with the composition $(La_{0.20}Nd_{0.40}Sm_{0.39}Zr_{0.01})_{0.89}Mg_{0.11}Ni_{3.27}Al_{0.17}Cr_{0.01}$. The obtained ingot was then mechanically crushed under an argon gas atmosphere and sieved to sort out powder of the hydrogen absorbing alloy having mesh sizes ranging from 400 mesh to 200 mesh. The particle size of the hydrogen absorbing alloy particles obtained in this manner was measured, and as a result, it was found that the hydrogen absorbing alloy particles had an average particle diameter of 65 µm.

With respect to 100 parts by weight of the obtained powder of the hydrogen absorbing alloy, 0.4 parts by weight of sodium polyacrylate, 0.1 parts by weight of carboxymethyl cellulose, 1.0 part by weight (in terms of solid content) of a dispersion (solid content: 50 wt %) of styrene-butadiene rubber (SBR), 1.0 part by weight of carbon black and 30 parts by weight of water were added and kneaded to prepare paste of a negative electrode mixture.

The paste of the negative electrode mixture was coated uniformly on both surfaces of a perforated iron plate as the negative electrode substrate such that the coatings had a fixed thickness. The perforated plate used was 60 µm thick and had surfaces plated with nickel.

After the paste was dried, the perforated plate with powder of the hydrogen absorbing alloy adhering thereto was extended by rolling and then cut to obtain the negative electrode 26 for size AA, containing the rare earth-Mg—Ni hydrogen absorbing alloy.

(2) Preparation of Positive Electrode

Nickel sulfate, zinc sulfate, magnesium sulfate and cobalt sulfate were weighed such that zinc, magnesium and cobalt accounted for 3 wt %, 0.4 wt % and 1 wt %, respectively, with respect to nickel, and were added to a 1 N (normality) aqueous solution of sodium hydroxide containing ammonium ions, to prepare an aqueous solution of the mixture. With the obtained aqueous solution of the mixture kept stirred up, a 10 N (normality) aqueous solution of sodium hydroxide was added by degrees to the aqueous solution of the mixture for reaction, and during the reaction, the pH was kept stably in the range of 13 to 14, to obtain a solid solution in the form of nickel hydroxide particles containing nickel hydroxide as a main constituent and additionally containing zinc, magnesium and cobalt.

The nickel hydroxide particles thus obtained were washed three times with pure water in an amount ten times that of the nickel hydroxide particles, then dehydrated and dried. The obtained nickel hydroxide particles were spherical in shape and had an average particle diameter of 10 µm.

Subsequently, with respect to 100 parts by weight of powder of the positive electrode active material, namely, the nickel hydroxide particles obtained in the aforementioned manner, 10 parts by weight of cobalt hydroxide powder were mixed, and further, 0.5 parts by weight of yttrium oxide, 0.3 parts by weight of zinc oxide and 40 parts by weight of an HPC-dispersed liquid were mixed to prepare paste of a positive electrode mixture. The positive electrode mixture paste was applied to a nickel foam sheet as the positive electrode substrate to be filled in pores of the nickel foam sheet. The nickel foam sheet carrying the positive electrode mixture was then dried and extended by rolling. After the rolling, the nickel foam sheet carrying the positive electrode mixture was cut into a predetermined shape, to obtain the positive electrode 24 for size AA. The positive electrode 24 had the positive electrode mixture carried thereon such that the positive electrode might have a capacity of 2000 mAh.

(3) Assembling of Nickel-Metal Hydride Secondary Cell

The positive and negative electrodes 24 and 26 obtained in the aforementioned manner were spirally rolled up with the separator 28 interposed therebetween, to form the electrode group 22. The separator 28 used in the electrode group 22 was non-woven fabric of sulfonated polypropylene fibers and had a thickness of 0.1 mm (weight per area: 53 g/m$^2$).

The electrode group 22 was put in the outer can 10 having a bottomed cylindrical shape, and a predetermined amount of an aqueous solution containing KOH, NaOH and LiOH was poured as the alkaline electrolyte solution into the outer can 10. The electrolyte solution had 0.02 N (normality) concentration of KOH, 7.0 N (normality) concentration of NaOH, and 0.8 N (normality) concentration of LiOH. Subsequently, the opening of the outer can 10 was closed with the cover plate 14 and its related components, to construct a size AA nickel-metal hydride secondary cell 2 having a nominal capacity of 2000 mAh. This nickel-metal hydride secondary cell is hereinafter referred to as cell a.

(4) Initial Activation of Cell

Initial activation of the cell a was repeated twice, the initial activation included charging the cell with a charging current of 200 mA (0.1 It) at a temperature of 25° C. for 16 hours and then discharging the cell at a discharge current of 400 mA (0.2 It) until the cell voltage became equal to 0.5 V. In this manner, the cell a was brought into a usable state.

Example 2

A nickel-metal hydride secondary cell (cell b) was fabricated in the same manner as the cell a of Example 1 except that the amount of Cr to be contained in the hydrogen absorbing alloy was varied such that the hydrogen absorbing alloy had the composition $(La_{0.20}Nd_{0.40}Sm_{0.39}Zr_{0.01})_{0.89}Mg_{0.11}Ni_{3.26}Al_{0.17}Cr_{0.2}$.

Example 3

A nickel-metal hydride secondary cell (cell c) was fabricated in the same manner as the cell a of Example 1 except that the amount of Cr to be contained in the hydrogen absorbing alloy was varied such that the hydrogen absorbing alloy had the composition $(La_{0.20}Nd_{0.40}Sm_{0.39}Zr_{0.01})_{0.89}Mg_{0.11}Ni_{3.23}Al_{0.17}Cr_{0.05}$.

Comparative Example 1

A nickel-metal hydride secondary cell (cell d) was fabricated in the same manner as the cell a of Example 1 except that the hydrogen absorbing alloy used contained no Cr and had the composition $(La_{0.20}Nd_{0.40}Sm_{0.39}Zr_{0.01})_{0.89}Mg_{0.11}Ni_{3.28}Al_{0.17}$.

2. Evaluation of Nickel-Metal Hydride Secondary Cells

(1) Self-Discharge Characteristics

The cells a to d, each of which had been subjected to the initial activation, were charged according to so-called $-\Delta V$ control (hereinafter referred to merely as $-\Delta V$ charging) in which the cell was charged with a charging current of 2000 mA (1.0 It) in an atmosphere of 25° C. up to a maximum cell voltage and then continuously charged thereafter until the cell voltage dropped by 10 mV. Subsequently, the cells were discharged at a discharge current of 400 mA (0.2 It) in the same atmosphere down to a discharge cutoff voltage of 1.0 V, and the discharged capacity of each cell was measured. The discharged capacity measured at this time is referred to as initial capacity. Subsequently, the cells were subjected to the $-\Delta V$ charging at a charging current of 2000 mA (1.0 It) in an atmosphere of 25° C., then after being left to stand for one month in an atmosphere of 60° C., the cells were discharged at a discharge current of 400 mA (0.2 It) in an atmosphere of 25° C. down to the discharge cutoff voltage of 1.0 V, and the discharged capacity of each cell was measured. The discharged capacity measured at this time is referred to as shelf capacity. Then, with respect to each cell, the capacity lost by self-discharge while the cell was left to stand for one month in the atmosphere of 60° C. was calculated as a self-discharge capacity (mAh), according to the formula (II) below.

$$\text{Self-discharge capacity(mAh)} = \text{Initial capacity} - \text{Shelf capacity} \quad \text{(II)}$$

The results are shown in Table 1. A cell with a smaller self-discharge capacity is less prone to self-discharge even if left to stand for a long period of time and has better self-discharge characteristics.

(2) Cycle Life Characteristics

The cells a to d, each of which had undergone the initial activation, were subjected to the $-\Delta V$ charging at a charging current of 2000 mA (1.0 It) in an atmosphere of 25° C. and then left to stand for 20 minutes.

Subsequently, each cell was discharged at a discharge current of 2000 mA (1.0 It) in the same atmosphere until the cell voltage became equal to 1.0 V and then left to stand for 10 minutes.

Provided that the above charge-discharge cycle constitutes one cycle, the number of cycles each of the cells underwent until the capacity retention rate dropped below 65% with respect to the initial capacity 100% was counted, the cycle count indicating a cycle life. Assigning the value "100" to the cycle count corresponding to the cycle life of the cell d of Comparative Example 1, the ratio of the cycle life of each of the cells a to c to the cycle life of the cell d was calculated. The results are also shown in Table 1.

(3) Evaluation Results Shown in Table 1

(i) The cells a to c of Examples 1 to 3 using the hydrogen absorbing alloys in which Cr is substituted for part of the Ni have smaller self-discharge capacities than that of the cell d of Comparative Example 1 using the hydrogen absorbing alloy containing no Cr. Specifically, where the cell d using the hydrogen absorbing alloy containing no Cr is left to stand for one month at 60° C., the cell undergoes a self-discharge of 488 (mAh). On the other hand, where the cell a using the hydrogen absorbing alloy containing 0.01 mole Cr is left to stand for one month at 60° C., the cell undergoes a self-discharge of 452 (mAh), proving that the cell a is improved in self-discharge characteristics by 36 (mAh), as compared with the cell d. Also, where the cell b using the hydrogen absorbing alloy containing 0.02 mole Cr is left to stand for one month at 60° C., the cell undergoes a self-discharge of 446 (mAh), proving that the cell b is improved in self-discharge characteristics by 42 (mAh), as compared with the cell d. Further, where the cell c using the hydrogen absorbing alloy containing 0.05 mole Cr is left to stand for one month at 60° C., the cell undergoes a self-discharge of 439 (mAh), proving that the cell c is improved in self-discharge characteristics by 49 (mAh), as compared with the cell d. From the above it can be said that, where Cr is contained in the hydrogen absorbing alloy even in a small amount of 0.01 moles, satisfactory self-discharge characteristics can be obtained and that the self-discharge characteristics can be further improved by increasing the Cr content.

(ii) The cell a using the hydrogen absorbing alloy containing 0.01 mole Cr has a cycle life ratio of 105, and the cell b using the hydrogen absorbing alloy containing 0.02 mole Cr has a cycle life ratio of 103. From this it follows that Cr contained in hydrogen absorbing alloys serves to improve cycle life characteristics. However, in the case of the cell c using the hydrogen absorbing alloy containing 0.05 mole Cr, the cycle life ratio is 96, showing that the cell c is lower in cycle life characteristics than the cell d of Comparative Example 1 using the hydrogen absorbing alloy containing no Cr. That is to say, too high a Cr content leads to lowering of the cycle life characteristics.

(iii) From the evaluation results explained above, it can be said that, especially where the Cr content is 0.01 moles or more and 0.02 moles or less, the cycle life can be prolonged while reducing the self-discharge capacity of the cell and thus both the self-discharge characteristics and the cycle life characteristics can be improved. Accordingly, in order to improve both the self-discharge characteristics and cycle life characteristics of the cell, the Cr content should preferably be set to fall within a range of 0.01 moles or more and 0.02 moles or less provided that the sum of the elements represented by RE and T in the general formula (I) and the Mg is 1 mole.

TABLE 1

| | Cell | Composition of hydrogen absorbing alloy | Cr content* (mole) | Self-discharge capacity (mAh) | Cycle life ratio |
|---|---|---|---|---|---|
| Example 1 | a | $(La_{0.20}Nd_{0.40}Sm_{0.39}Zr_{0.01})_{0.89}Mg_{0.11}Ni_{3.27}Al_{0.17}Cr_{0.01}$ | 0.01 | 452 | 105 |
| Example 2 | b | $(La_{0.20}Nd_{0.40}Sm_{0.39}Zr_{0.01})_{0.89}Mg_{0.11}Ni_{3.26}Al_{0.17}Cr_{0.02}$ | 0.02 | 446 | 103 |
| Example 3 | c | $(La_{0.20}Nd_{0.40}Sm_{0.39}Zr_{0.01})_{0.89}Mg_{0.11}Ni_{3.23}Al_{0.17}Cr_{0.05}$ | 0.05 | 439 | 96 |
| Comparative Example 1 | d | $(La_{0.20}Nd_{0.40}Sm_{0.39}Zr_{0.01})_{0.89}Mg_{0.11}Ni_{3.28}Al_{0.17}$ | 0 | 488 | 100 |

*"Cr content" indicates a value(s) on the condition that the sum of the elements represented by RE and T in the general formula (I) and the Mg is 1 mole.

The present invention is not limited to the aforementioned embodiment or examples and may be modified in various ways. For example, the nickel-metal hydride secondary cell may be a cell having a rectangular prism shape, and a mechanical structure thereof is not particularly limited.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A nickel-metal hydride secondary cell comprising a container, and an electrode group hermetically contained in the container together with an alkaline electrolyte solution, the electrode group including a separator, a negative electrode and a positive electrode, wherein the negative electrode contains a hydrogen absorbing alloy having a composition represented by a general formula: $(RE_{1-x}T_x)_{1-y}Mg_yNi_{z-a}Al_a$ (where RE is at least one element selected from among Y, Sc and rare-earth elements, T is at least one element selected from among Zr, V and Ca, and subscripts x, y, z and a are values respectively satisfying $0 \leq x$, $0.05 \leq y \leq 0.35$, $2.8 \leq z \leq 3.9$, and $0.10 \leq a \leq 0.25$), the hydrogen absorbing alloy has a crystal structure in which an $AB_2$ subunit and an $AB_5$ subunit are superimposed one upon the other, Cr is substituted for part of the Ni, a sum of the elements represented by RE and T and the Mg is 1 mole, and a content of the Cr is 0.01 moles or more and 0.02 moles or less.

2. The nickel-metal hydride secondary cell according to claim 1, wherein:

the alkaline electrolyte solution contains NaOH as a main constituent of a solute thereof.

3. A negative electrode for a nickel-metal hydride secondary cell, wherein the negative electrode contains a hydrogen absorbing alloy having a composition represented by a general formula: $(RE_{1-x}T_x)_{1-y}Mg_yNi_{z-a}Al_a$ (where RE is at least one element selected from among Y, Sc and rare-earth elements, T is at least one element selected from among Zr, V and Ca, and subscripts x, y, z and a are values respectively satisfying $0 \leq x$, $0.05 \leq y \leq 0.35$, $2.8 \leq z \leq 3.9$, and $0.10 \leq a \leq 0.25$), the hydrogen absorbing alloy has a crystal structure in which an $AB_2$ subunit and an $AB_5$ subunit are superimposed one upon the other, Cr is substituted for part of the Ni, a sum of the elements represented by RE and T and the Mg is 1 mole, and a content of the Cr is 0.01 moles or more and 0.02 moles or less.

* * * * *